United States Patent
Frederiksen et al.

(10) Patent No.: US 10,100,810 B2
(45) Date of Patent: Oct. 16, 2018

(54) WIND TURBINE YAW CONTROL SYSTEMS (71) Applicant: Vestas Wind Systems A/S, Aarhus N. (DK)

(72) Inventors: Thomas Frederiksen, Randers Nv (DK); Lars Vermund Rasmussen, Århus (DK)

(73) Assignee: Vestas Wind Systems A/S, Aarhus N. (DK)

( * ) Notice: Subject to any disclaimer, the term of this patent is extended or adjusted under 35 U.S.C. 154(b) by 262 days.

(21) Appl. No.: 14/441,630

(22) PCT Filed: Jul. 1, 2013

(86) PCT No.: PCT/DK2013/050217
§ 371 (c)(1),
(2) Date: May 8, 2015

(87) PCT Pub. No.: WO2014/071947
PCT Pub. Date: May 15, 2014

(65) Prior Publication Data
US 2015/0275858 A1    Oct. 1, 2015

(30) Foreign Application Priority Data

Nov. 9, 2012 (DK) ................................ 2012 70689

(51) Int. Cl.
*F03D 7/02* (2006.01)
*F03D 13/20* (2016.01)
(Continued)

(52) U.S. Cl.
CPC ............. *F03D 7/0204* (2013.01); *F03D 1/06* (2013.01); *F03D 7/0244* (2013.01); *F03D 7/043* (2013.01);
(Continued)

(58) Field of Classification Search
CPC ...... F03D 7/0204; F03D 7/0244; F03D 7/043; F03D 7/0208; F03D 7/0212; Y02E 10/721

See application file for complete search history.

(56) References Cited

U.S. PATENT DOCUMENTS 5,990,568 A    11/1999 Hildingsson et al.
7,436,083 B2 *  10/2008 Shibata ................. F03D 7/0204
                                                    290/44

(Continued)

FOREIGN PATENT DOCUMENTS

DE    102007049368 A1    5/2008
EP        1662138 A1    5/2006

(Continued)

OTHER PUBLICATIONS

International Searching Authority, International Search Report issued in corresponding Application No. PCT/DK2013/050217, dated Jan. 7, 2014, 14 pages.

(Continued)

*Primary Examiner* — Logan Kraft
*Assistant Examiner* — Elton Wang
(74) *Attorney, Agent, or Firm* — Wood Herron & Evans LLP (57) ABSTRACT

In a disclosed system, yaw rotation is generated by motors, the output torque of which is maintained substantially constant when the motor speed is within a predetermined range, to reduce the variation in the output torque. In another system, yaw rotation is generated by pinion gears each controlled by a motor mounted on the tower of the generator and arranged to rotate a main gear wheel attached to the nacelle. To prevent wear on the motors arising from differences in backlash between the pinion gears and the main gear wheel, each motor is controlled to generate a low output torque until all pinion gears have engaged the main gear (Continued)

wheel, after which the full output torque is applied to all motors. In a further system, braking is arranged to be provided either by mechanical brakes or by generating a counter-torque in the motors, in dependence on the sensed external load.

14 Claims, 7 Drawing Sheets (51) Int. Cl.
*F03D 7/04* (2006.01)
*F03D 1/06* (2006.01)

(52) U.S. Cl.
CPC ............ *F03D 13/22* (2016.05); *Y02E 10/721* (2013.01); *Y02E 10/723* (2013.01)

(56) References Cited

U.S. PATENT DOCUMENTS

| | | |
|---|---|---|
| 2007/0158926 A1 | 7/2007 | Hahmann |
| 2011/0309620 A1* | 12/2011 | Fujino ................... F03D 7/0204 290/44 |
| 2011/0311359 A1* | 12/2011 | Bjork ..................... F03D 7/0204 416/1 |
| 2011/0318178 A1* | 12/2011 | Andersen .............. F03D 7/0204 416/1 |
| 2012/0027589 A1 | 2/2012 | Haag et al. |

FOREIGN PATENT DOCUMENTS

| | | |
|---|---|---|
| EP | 2189656 A2 | 5/2010 |
| EP | 2395237 A2 | 12/2011 |
| EP | 2402597 A1 | 1/2012 |
| JP | 2005113899 A | 4/2005 |
| JP | 201213085 A | 1/2012 |
| WO | 9722804 A1 | 6/1997 |
| WO | 2010100271 A2 | 9/2010 |
| WO | 2011096078 A1 | 8/2011 |
| WO | 2012000504 A1 | 1/2012 |

OTHER PUBLICATIONS

Danish Patent and Trademark Office, Search Report issued in corresponding Application No. PA 2012 70689, dated Jun. 25, 2013, 4 pages.
Japanese Patent Office, Notification of Reasons for Refusal in JP Application No. 2015-541014, dated Dec. 26, 2017.
Japanese Patent Office, Notification of Reasons for Refusal in JP Application No. 2015-541014, dated Aug. 20, 2018.

* cited by examiner

WIND TURBINE YAW CONTROL SYSTEMS

The present invention relates to wind turbine generators, and in particular to wind turbine generators comprising an assembly of one or more blades which are arranged to rotate about a horizontal axis and in which the blade assembly is also arranged for rotational movement about a vertical axis, which is also known as yaw or azimuthal rotation.

By allowing rotation about a vertical axis, this enables the blade assembly to be oriented such that the blades always face the wind direction and thereby convert wind energy into electrical energy with optimum efficiency.

Figure 1:
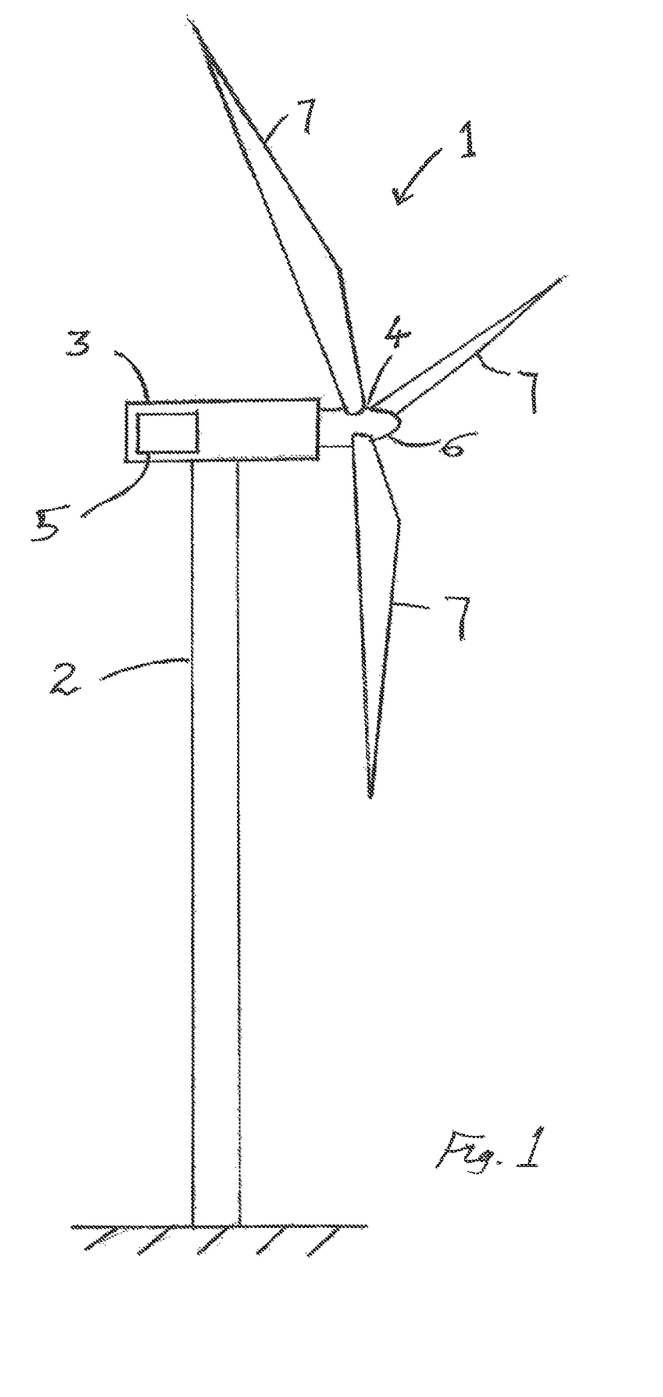
FIG. 1 illustrates the main structural components of a wind turbine.

A typical wind turbine generator is illustrated in FIG. 1. The wind turbine generator 1 comprises a tower 2, a nacelle 3 mounted at top of the tower 2 and a rotor 4 operatively coupled to a generator 5 within the nacelle 3. The wind turbine 1 converts kinetic energy of the wind into electrical energy. In addition to the generator 5, the nacelle 3 houses the various components required to convert the wind energy into electrical energy and also the various components required to operate and optimize the performance of the wind turbine 1. The tower 2 supports the load presented by the nacelle 3, the rotor 4 and other wind turbine components within the nacelle 3.

The rotor 4 includes a central hub 6 and three elongate rotor blades 7 of approximately planar configuration which extend radially outward from the central hub 6. In operation, the blades 7 are configured to interact with the passing air flow to produce lift that causes the central hub 6 to rotate about its longitudinal axis. Wind exceeding a minimum level will activate the rotor 4 and allow it to rotate within a plane substantially perpendicular to the direction of the wind. The rotation is converted to electric power by the generator 5 and is usually supplied to the utility grid.

The nacelle 3 is mounted on the tower 2 by means of a coupling which permits the nacelle 3, and thereby also the blades 7, to rotate about a vertical axis. Yaw rotation is carried out in a sequence of: (a) initiating nacelle rotation; (b) maintaining nacelle rotation; and (c) stopping nacelle rotation.

It is usual for the yaw rotation to be powered by means of one or more electric motors, also known as yaw gears. The wind direction relative to the nacelle orientation is sensed to generate a control signal which is supplied to the electric motor to effect rotation of the blade assembly such that the blades 7 face the wind direction.

During operation, the blade assembly is typically subject to large shear forces which generate turning moments, which may act in a sense to cause the blade assembly to rotate away from the desired yaw angle. To counteract such turning moments, such control systems are conventionally provided with passive mechanical brakes which are arranged to retain the blade assembly at the desired yaw angle. Alternatively, or in addition, the electric motors may be arranged to generate a counter-torque which acts on the blade assembly in the sense opposite to that of the turning moments arising from the shear forces.

Figure 2:
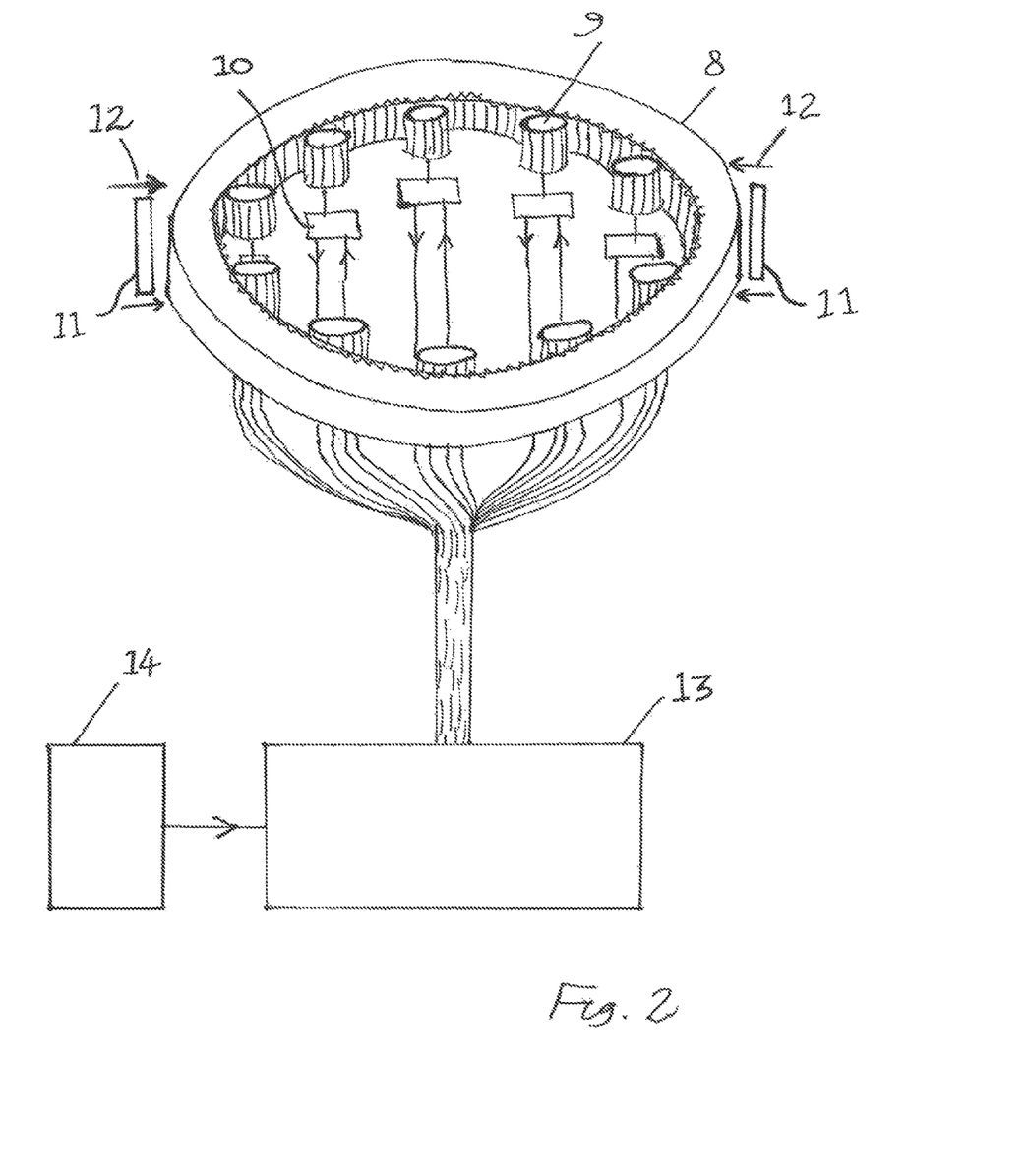
FIG. 2 is a schematic diagram of the control system of a preferred embodiment of the present invention.

A typical arrangement for controlling the yaw angle of a wind turbine blade will now be described with reference to FIG. 2.

A large toothed gear wheel 8 is attached to the tower 2 of the wind turbine generator 1. A number of toothed pinion gears 9 are engaged with the large gear wheel 8 around its circumference. The pinion gears 9 are driven by respective electric motors 10 which are mounted on the nacelle 3 of the wind turbine generator 1. As with all gearing arrangements involving toothed gears, there is a degree of backlash, also referred to as "lost motion", "play" or "hysteresis", which results from the teeth of the pinion gears 9 not fully meshing with the teeth of the main gear wheel 8. Thus, during a reversal in the sense of rotation, the pinion gears 9 will rotate to a certain extent before fully engaging the main gear wheel 8. The extent of the backlash will depend on the tolerances of manufacture, such that the degree of backlash for each of the pinion gears 9 will in general be different. In order to prevent rotation of the nacelle 3, mechanical friction brakes 11 are applied to the main gear wheel 9 in the direction of arrows 12.

The electric motors 10 are controlled by a control module 13. The wind direction is detected by a sensor module 14 which generates an output signal which is supplied to the control module 13.

Other yaw systems are described in EP 2402597 A1, EP 2189656 A2 and U.S. Pat. No. 5,990,568.

A number of problems arise during the operation of such conventional systems.

First, the torque required to be generated by the electric motors 10 is subject to the shear forces referred to above, which may change rapidly. This can give rise to undesirable vibrations in the wind turbine generator 1, which can shorten the lifetime of the components of the generator 1.

Second, since the degree of backlash is different for each pinion gear 9, it follows that, during a reversal in the yaw rotation, not all pinion gears 9 will become engaged with the main gear wheel 8 at the same time, and so some of the motors 10 will be required to generate a much higher level of output torque than others. Over time, the motors 10 which drive those pinion gears 9 having the least amount of backlash will be subjected to a greater load and therefore exhibit a greater degree of wear than the other motors 10 and will require servicing or replacement more frequently.

Third, during a braking operation using passive mechanical brakes, the shear forces can sometimes be so great as to cause the brakes to fail or slip. Not only would this lead to the blade assembly being oriented away from the desired yaw angle, but also to possible failure or breakage of other components of the wind turbine generator 1.

It would therefore be desirable to provide control systems which overcome, or at least mitigation, some or all of the above disadvantages of known systems.

Thus, in accordance with a first aspect of the present invention there is provided a control system for a horizontal-axis wind turbine generator comprising a nacelle mounted on a tower, the nacelle being and arranged to be rotated with respect of the tower about a vertical axis by a motor, the system comprising: means for controlling the power supplied to the motor such that, while the rotational speed remains within a predetermined range of values defined by a minimum speed and a maximum speed, the output torque of the motor is also maintained within a predetermined range of values defined by a minimum torque and a maximum torque, wherein the ratio of the maximum speed to the minimum speed is greater than the ratio of the maximum torque to the minimum torque.

In this way, the level of torque generated by the motor is varied to a lesser extent than the rotational speed of the motor, thereby reducing the undesirable vibrations which occur when the output torque changes.

In the preferred control system, the means for controlling the power supplied to the motor is arranged such that, when the rotational speed moves outside the predetermined range of values, the output torque of the motor is changed to a new predetermined range of values to cause the rotational speed to return to a level within the predetermined range. This enables the motor to operate within a torque-speed regime in which the efficiency of the motor is optimised.

It is especially preferred that the motor is controlled to provide a substantially constant output torque whenever the rotational speed remains within the predetermined range. With such a control protocol, any variations in torque are restricted to situations when the rotational speed of the motor moves outside its current range.

The predetermined range of values of the rotational speed can be changed in accordance with the operating conditions of the wind turbine generator.

Although it is preferred that the predetermined range of values for the rotational speed of the motor remain fixed for a given set of operating conditions, it would be possible alternatively to provide different respective predetermined ranges of values for the different discrete values of the output torque.

In accordance with a second aspect of the present invention there is provided a control system for a horizontal-axis wind turbine generator in which the nacelle is arranged for rotation about a vertical axis relative to the tower by means of a plurality of electric motors each arranged to control rotation of a respective pinion gear, the pinions gears being arranged for engagement with a single gear wheel, the system comprising: means for controlling the speed of each motor such that the speed is at a first level until each of the respective pinion gears has fully engaged the single gear wheel, and a second level thereafter to effect relative rotation of the nacelle and the tower, the second level being higher than the first level.

This prevents any single motor from developing the high level of output torque required to generate yaw rotation of the nacelle before all of the pinion gears have become fully engaged with the single gear wheel, and thereby reduces the wear on the motors which would otherwise arise if only one or some of the pinion gears were fully engaged before the associated motors developed the full output torque required for yaw rotation.

When the pinion gears have fully engaged the single gear wheel, the power supplied to the motor is preferably such that, while the rotational speed remains within a predetermined range of values defined by a minimum speed and a maximum speed, the output torque of the motor is also maintained within a predetermined range of values defined by a minimum torque and a maximum torque, wherein the ratio of the maximum speed to the minimum speed is greater than the ratio of the maximum torque to the minimum torque.

The control system preferably further comprises means for determining the output torque of each motor. In this way, it can readily be established that the output torque of each motor is indeed at the low level before supplying the motors which sufficient power to generate the high level of output torque.

The torque determining means preferably comprises means for sensing the rotational speed of each motor. Such sensing means are readily available and can take the form of a simple optical or magnetic rotary displacement encoder mounted on the motor shaft. The value of the rotational speed is then used to determine the output torque of the motor from the level of power supplied to the motor.

In accordance with a third aspect of the present invention there is provided a control system for a horizontal-axis wind turbine generator in which the nacelle is arranged for rotation about a vertical axis relative to the tower by means of one or more electric motor(s), and in which a mechanical brake is provided, the system comprising: means for detecting first and second operating conditions of the wind turbine generator; and means responsive to a first sensed operating condition for engaging the mechanical brake so as to brake the relative rotation of the nacelle and the tower, and responsive to a second sensed operating condition for controlling the power supplied to the motor(s) such that the motor(s) is/are arranged to generate a counter-torque to brake the relative rotation of the nacelle and the tower.

In this way, wear on the mechanical brake can be reduced by sharing the overall braking load with the motor(s).

When the motor(s) is/are arranged to generate a braking counter-torque, the power supplied to the motor(s) is preferably such that, while the rotational speed remains within a predetermined range of values defined by a minimum speed and a maximum speed, the output torque of the motor(s) is also maintained within a predetermined range of values defined by a minimum torque and a maximum torque, wherein the ratio of the maximum speed to the minimum speed is greater than the ratio of the maximum torque to the minimum torque, thereby to provide the advantages referred to above.

The control system is preferably arranged such that, in response to the first sensed operating condition, the motor(s) generate(s) substantially no counter-torque.

The control system is preferably arranged such that, in response to the second sensed operating condition, the mechanical brake is disengaged, so as to reduce the level of wear on the brakes.

The first sensed operating condition may be an external load which is less than a first predetermined value, and the second sensed operating condition may be an external load which is greater than a second predetermined value.

In this case, the first predetermined value of the external load is advantageously less than the second predetermined value of the external load, since if the first and second predetermined external loads were chosen to be the same, this could give rise to instability when the external load is close to this value, since the different modes of braking could alternate rapidly. This is effectively prevented by requiring the first predetermined value to be lower than the second predetermined value. This situation is analogous to the dual-threshold thermostat settings in domestic central heating systems, in which the system is energised when the temperature falls below a first, lower value and is subsequently de-energised when the temperature exceeds a second, higher value, thereby preventing the rapid on/off oscillations which could arise if only a single temperature threshold were used.

The present invention extends to a method for controlling a horizontal-axis wind turbine generator comprising a nacelle mounted on a tower, the nacelle being and arranged to be rotated with respect of the tower about a vertical axis by one or more motor(s), the method comprising: controlling the power supplied to the motor(s) such that, while the rotational speed remains within a predetermined range of values defined by a minimum speed and a maximum speed, the output torque of the motor(s) is also maintained within a predetermined range of values defined by a minimum torque and a maximum torque, wherein the ratio of the maximum speed to the minimum speed is greater than the ratio of the maximum torque to the minimum torque.

The present invention also extends to a method for controlling a horizontal-axis wind turbine generator in which the nacelle is arranged for rotation about a vertical axis relative to the tower by means of a plurality of electric motors each arranged to control rotation of a respective pinion gear, the pinions gears being arranged for engagement with a single gear wheel, the method comprising: controlling the power supplied to each motor such that the torque is at a first level until each of the respective pinion gears has fully engaged the single gear wheel, and a second level thereafter to effect relative rotation of the nacelle and the tower, the second level being higher than the first level.

The present invention further extends to a method for controlling a horizontal-axis wind turbine generator in which the nacelle is arranged for rotation about a vertical axis relative to the tower by means of at least one electric motor, and in which a mechanical brake is provided, the method comprising: detecting first and second operating conditions of the wind turbine generator; and in response to a first sensed operating condition, causing the mechanical brake to brake the relative rotation of the nacelle and the tower; and, in response to a second sensed operating condition, controlling the power supplied to the motor(s) such that the motor(s) is/are arranged to generate a counter-torque to brake the relative rotation of the nacelle and the tower.

Preferred embodiments of the present invention will now be described with reference to the accompanying drawings, in which.

In the following description of the preferred embodiments, the same reference numerals are used throughout to described the same, or equivalent, elements or features.

Referring back to FIG. 2, in the preferred embodiments of the present invention a plurality of electric motors 10 are arranged to control the rotation of a respective number of pinion gears 9. Each motor 10 receives power from the control module 13, and each motor 10 incorporates a respective rotary displacement encoder (not shown) which supplies an output signal to the control module 13 which is used by the control module 13 to calculate the current rotational speed of the motor. The control module 13 is therefore able to calculate the output torque of each motor in dependence on (a) the level of power supplied to the motor; and (b) the rotational speed of the motor.

Each of the electric motors 10 is an a.c. motor powered from the mains grid. Each of the motors 10 is connected to the mains grid via a frequency converter (not shown) which converts the mains frequency of typically 50 Hz or 60 Hz, depending on the territory, into the frequency appropriate for the desired rotational speed of the motor 10.

The power level supplied to the electric motors 10 is controlled in dependence on a number of operating conditions, as will be described in greater detail below. The control module 13 is arranged to supply the electric motors 10 with a level of power appropriate to one of several operating modes. Such operating modes may include: (a) a stationary mode, in which the wind turbine blades 7 are maintained at a desired yaw angle; (b) a yawing mode, in which the wind turbine blades 7 are rotated towards a desired yaw angle; and (c) a braking mode, in which the blades are currently rotating about the yaw axis away from a desired yaw angle, for example due to wind shear forces. The motors 10 may also be controlled in dependence on the shift in wind direction, the amount of turbulence and/or the load level on one or more parts of the wind turbine generator.

In a first embodiment of the present invention, the control module 13 supplies power to each of the electric motors 10 at a level determined by the following protocol. Whenever the rotational speed of the motor is within a predetermined range of values, the output torque of the motor is maintained substantially constant. However, if the motor speed moves to a level outside this range, the output torque of the motor is then shifted to a different level so as to bring the rotational speed back to a value within the predetermined range. It will be appreciated that this protocol restricts the number of changes in the level of output torque of each motor to the number of occasions when the rotational speed of the motor moves outside the predetermined range. In this way, the undesirable effects of a large number of changes in the output torque are mitigated.

Figure 3:
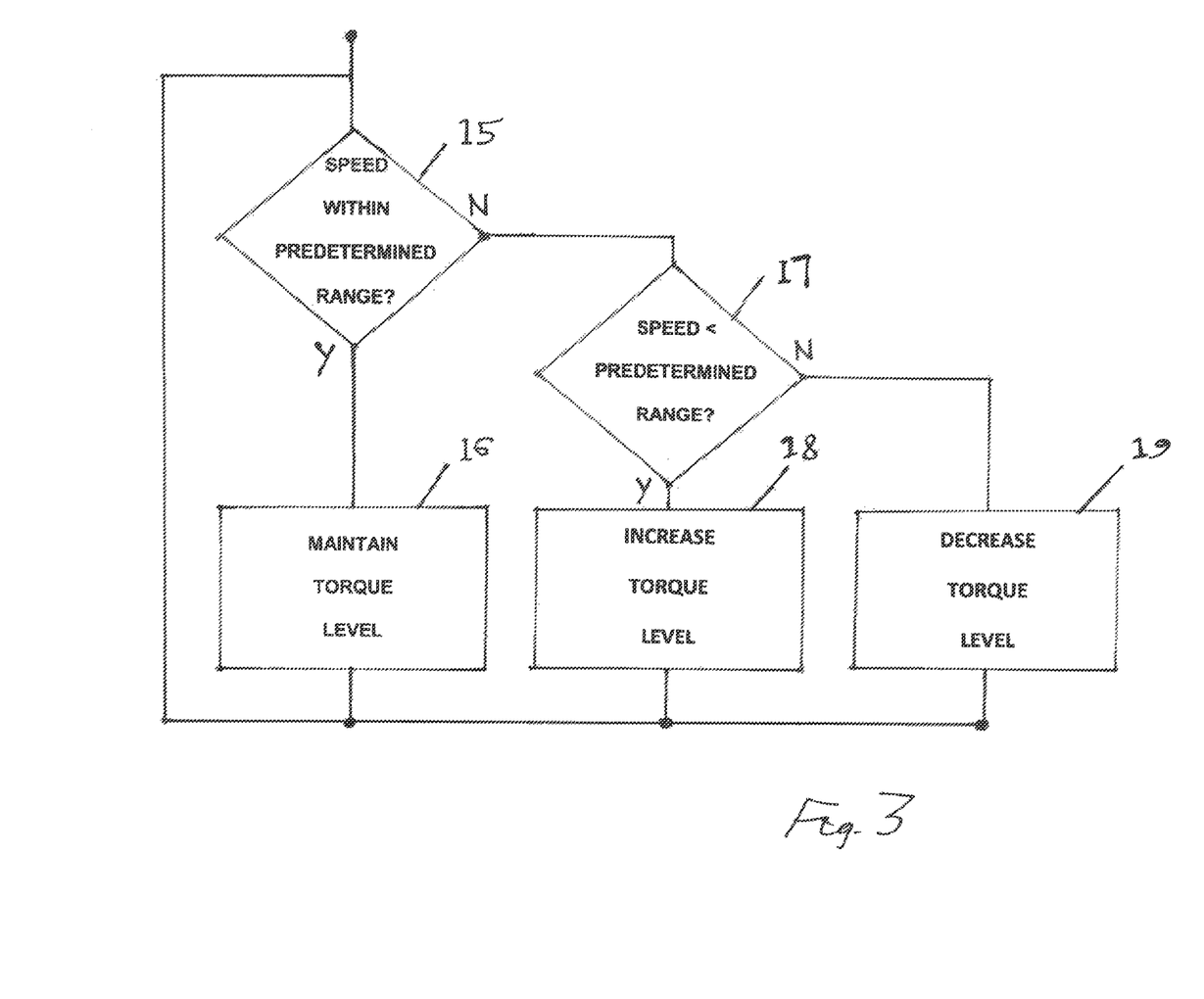
FIG. 3 is a flowchart illustrating a preferred method in accordance with a first embodiment of the present invention.

The steps of this protocol are illustrated in FIG. 3, in which, for each motor 10, the current rotational speed is sensed at step 15 and a determination made as to whether the speed is within the predetermined range. If this is the case, then the current torque level is maintained at step 16 and the protocol returns to step 15. However, if the speed has shifted to a level outside this range, then a determination is made at step 17 as to whether the rotational speed is below the predetermined range. If so, then the output torque is increased at step 18 to a higher level and the protocol returns to step 15. If, however, the current rotational speed is assessed at step 17 to be above the predetermined range, then the torque level is decreased at step 19 to a lower level, and the protocol returns to step 15.

In this way, the output torque of the each motor 10 is maintained at a near-constant level provided that the rotational speed of the motor 10 remains within the predetermined range, and shifts to a new level only when the rotational speed of the motor 10 moves outside the range.

Although this protocol is optimised by retaining the output torque at a substantially constant value when the rotational speed is within the predetermined range, it will be appreciated that the level of torque may shift slightly from this constant value. The important feature of this protocol is that the variations in output torque of each motor are kept to a minimum, where possible.

Figure 4:
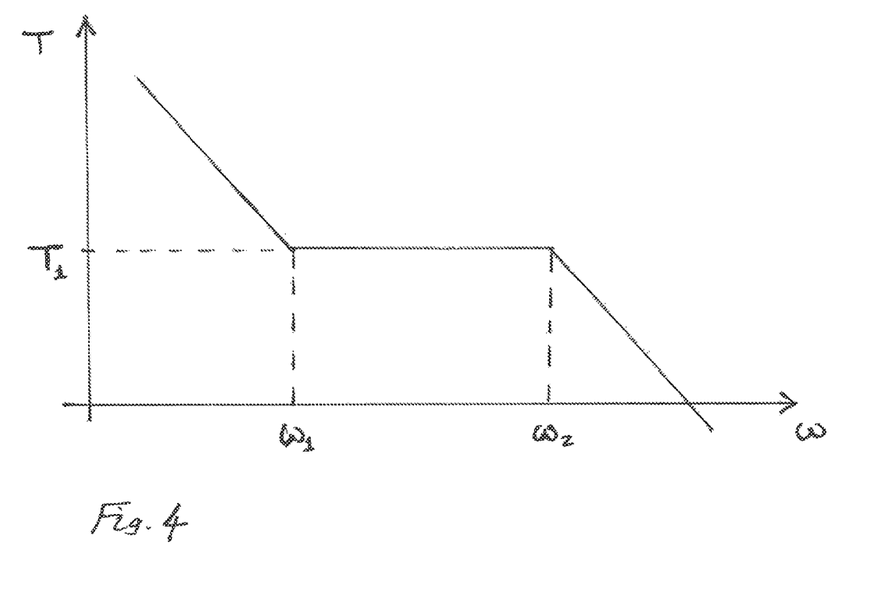
FIG. 4 is a graph illustrating the relationship between output torque and rotational speed in accordance with the embodiment of FIG. 3.
Figure 5:
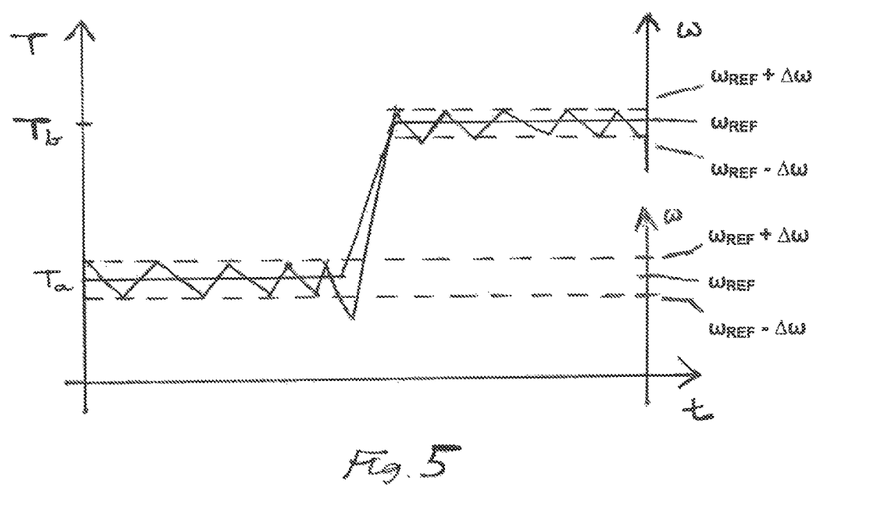
FIG. 5 is a graph illustrating the time variation of both output torque and rotational speed in accordance with the embodiment of FIG. 3.

The dependence of output torque T of the motor 10 on the rotational speed w of the motor 10 is illustrated in FIG. 4, from which it can be seen that, when the rotational speed is between the values $\omega_1$ and $\omega_2$, the output torque T is maintained at level $T_1$. Outside of this range of rotational speed $\omega$, the torque T is ramped up or down to a new level (not shown). This relationship is further illustrated in FIG. 5, which shows the variation with respect to time t of both torque T and rotational speed $\omega$ as the rotational speed $\omega$ moves from a level within a predetermined range defined by $\omega+/-\Delta\omega$, to a level outside this range, the output torque T moves from a first, relatively low constant level $T_a$ to a second, relatively high constant level $T_b$, so as to cause the rotational speed to return to a value within the predetermined range.

Figure 6:
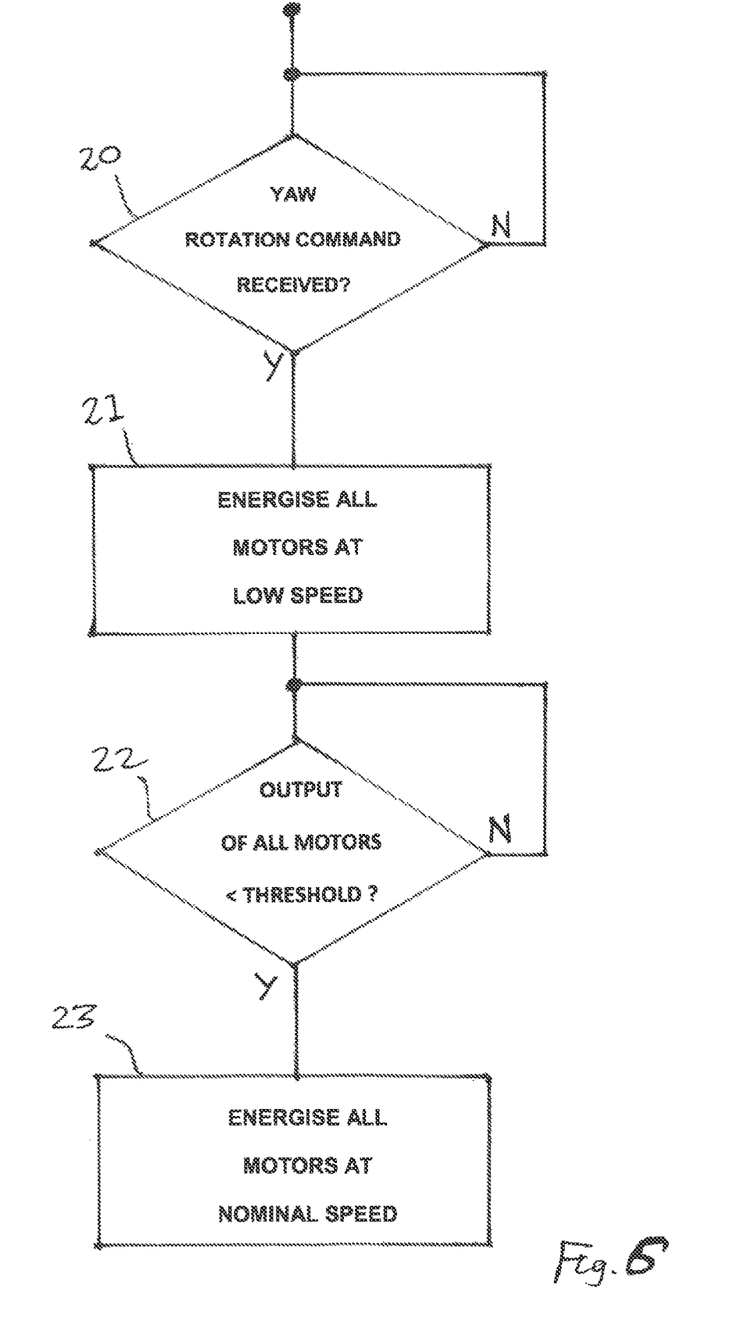
FIG. 6 is a flowchart illustrating a preferred method in accordance with a second embodiment of the present invention.

In a second embodiment of the present invention, which is used to initiate a yaw rotation of the wind turbine blades 7, the control module 13 supplies power to each of the electric motors 10 at a level determined by the following protocol, illustrated by the flowchart of FIG. 6.

To initiate yaw rotation, the control module 13 generates a yaw rotation command signal. Thus, the first step 20 of the protocol is to determine if such a yaw command signal has been generated. If not, then this step 20 is repeated continuously until such time as a signal is generated, at which point all of the electric motors 10 are energised at a first, low speed at step 21. As described above, the output torque of each motor 10 is calculated by measuring the rotational speed of the motor and the input power of the motor 10. Initially, some of the pinion gears 9 will not be fully engaged with the main gear wheel 8 due to the effects of backlash. Thus, the initial rotational speed of those motors 10 which are connected to these pinion gears 9 will be at a relatively high level with associated low output torque, since there will not be any resistance to rotation from the inertia of the main gear wheel 8. However, for those pinion gears 9 which are already fully engaged with the main gear wheel 8, the rotational speed of associated motors 10 will be at a relatively low level with associated high output torque, since they will encounter inertial resistance from the main gear wheel 8. Thus, at step 22, it is determined as to whether all of the pinion gears 9 are fully engaged with the main gear wheel 8 by measuring the rotational speed of each of the motors 10. If the rotational speed of any one of the motors is at the high level, which implies that the associated pinion gear 9 is still not fully engaged, then this determining step 22 is repeated until all of the pinion gears 9 are fully engaged with the main gear wheel 8, at which point all of the motors are energised at the nominal speed at step 23.

The reason behind this protocol is to ensure that all of the pinion gears 9 are fully engaged with the main gear wheel 8 before any one of the motors 10 is operated at full torque. In this way, the load on the motors 10 is shared, thereby to reduce wear on the motors and the need for frequent replacement. It will be appreciated that manufacturing tolerances will lead to the same pinion gears 9 being repeatedly engaged with the main gear wheel 8 before the other pinion gears 9. Thus, without such a protocol, the motors 10 which are associated with the pinion gears 9 which tend to engage the main gear wheel 8 first would suffer the greatest loading and will be the first to require servicing or replacement.

Figure 7:
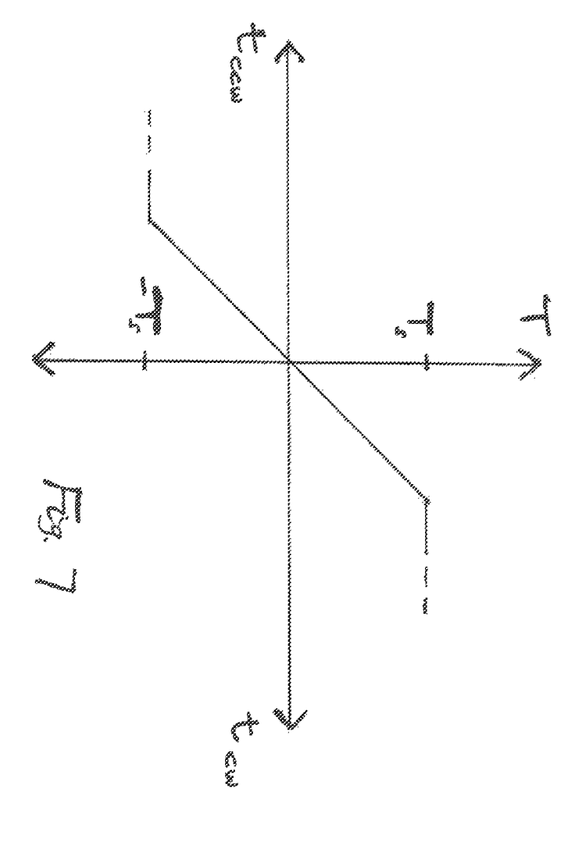
FIG. 7 is a graph illustrating the variation of output torque with time in accordance with the embodiment of FIG. 6.

The increase in the absolute value of the output torque T of the motor 10 with respect to time for clockwise rotation $t_{CW}$ (or counter-clockwise rotation $t_{CCW}$) in this embodiment is illustrated in FIG. 7, from which it can be seen that the output torque is initially zero and gradually increases until it reaches the starting, or pre-load, torque $T_s$ (for clockwise rotation, or $-T_s$ for counter-clockwise rotation), at which point all of the drives are engaged with the main gear wheel 8 and ready to ramp up to the full torque required to rotate the main gear wheel 8.

In a third embodiment of the present invention, which is used to control the reduction in speed of yaw rotation of the wind turbine blades 7, the control module 13 is arranged to control the required braking in dependence on the external load. In this arrangement, the sensor module 14 described above with reference to FIG. 2 is arranged to provide an output signal indicative of the external load. When the external load is at a low level, all of the braking is performed using purely the mechanical friction brakes 11 (see FIG. 2). However, when the external load is at a high level, all of the braking is performed by applying a suitable counter-torque to each of the electric motors 10, i.e. a torque in the sense which reduces the yaw speed of the wind turbine blades 7. The reason for the interval between the two external loads is to prevent the generation of undesirable vibrations which might result if a single threshold value of the external load-were used to determine the type of braking to be performed. This is analogous to domestic central heating systems which use dual thresholds to control a thermostat. Clearly, when braking is initiated, and the external load is between these values, then the system must be able to determine which mode of braking to use. In this case, a single threshold value is used. However, during operation, this reverts to the dual-threshold protocol described above.

Such an arrangement is advantageous in enabling the load on the motors to be shared when the external load is high, and when the required braking force is therefore also likely to be high. In addition, this reduces the level of wear in the mechanical friction brakes 11

Figure 8:
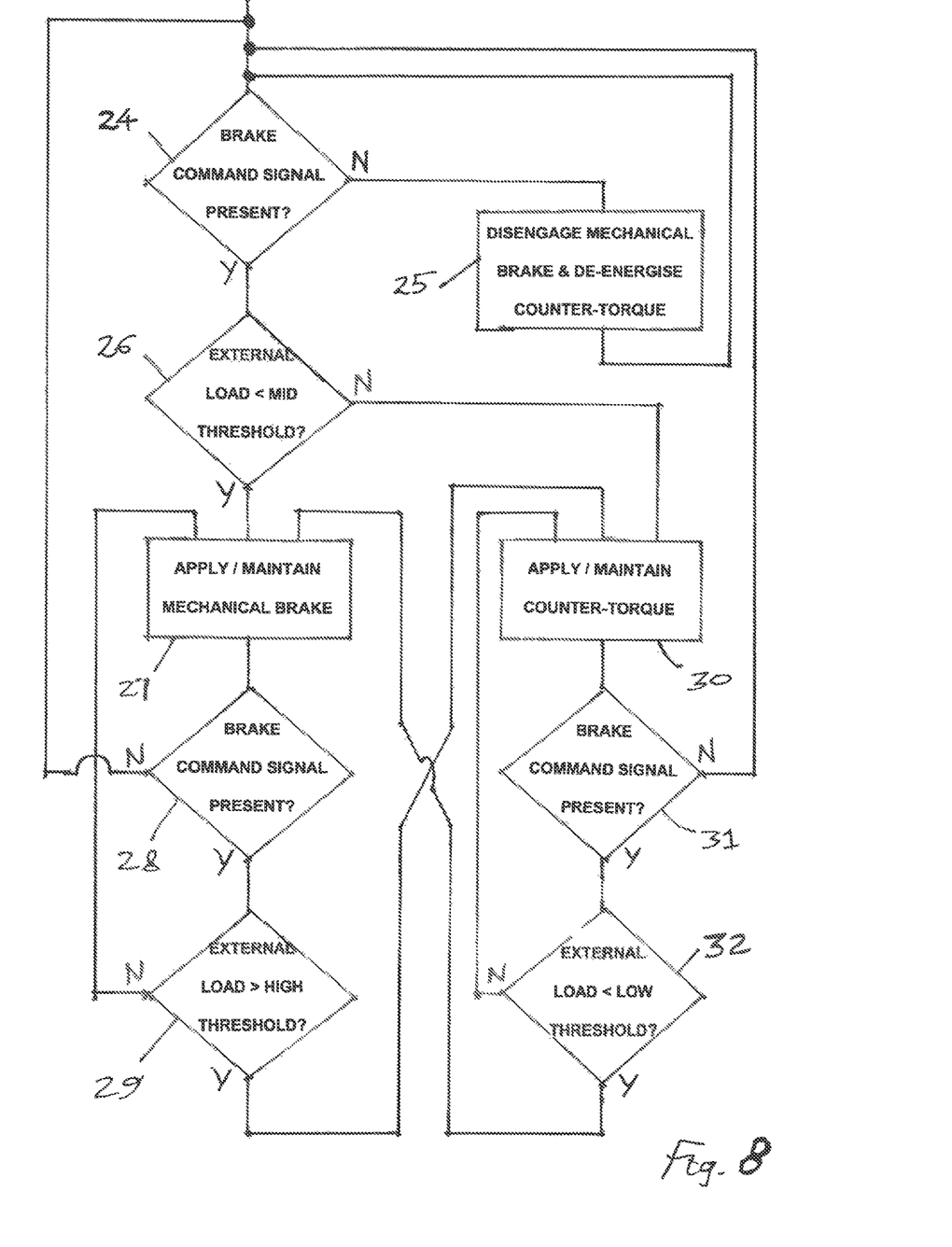
FIG. 8 is a flowchart illustrating a preferred method in accordance with a third embodiment of the present invention.

This protocol is illustrated in FIG. 8. It is first determined whether a brake command signal has been generated at step 24. If no brake command signal is present, it is ensured at step 25 that no mechanical braking or counter-torque is applied. Step 24 is then repeated until such time as a brake command signal has been generated, in which case, it is then determined at step 26 whether the external load is less than the single threshold value. If so, then mechanical braking is initiated at step 27, followed by the step 28 of confirming that the brake command signal is still present. If the brake command signal is no longer present, the protocol returns to step 24. If the brake command signal is still present, it is then determined at step 29 as to whether the external load has risen above the high threshold. If not, then the protocol reverts to step 27 where mechanical braking is maintained. If, however, the external load has indeed risen above the high threshold, then the mechanical braking is stopped (not shown) and the motors 10 controlled so as to generate counter-torque braking at step 30, followed by the step 31 of confirming that the brake command signal is still present. If the brake command signal is no longer present, the protocol returns to step 24. If the brake command signal is still present, it is then determined at step 32 as to whether the external load has fallen below the low threshold. If not, then the protocol reverts to step 30 where the counter-torque braking is maintained. If, however, the external load has indeed fallen below the low threshold, then the counter-torque braking is stopped (not shown) and the mechanical friction braked engaged at step 27.

Although in this protocol, there is only a single braking mode at any time, i.e. either mechanical braking or counter-torque braking, it would be possible alternatively to arrange for both mechanical and counter-torque braking to be applied at low external loads, since this would reduce even more the wear on the mechanical friction brakes 11. In addition, it would also be possible to initiate braking using both modes and then to revert to a single braking mode when the external load either falls below the low threshold or exceeds the high threshold.

Figure 9:
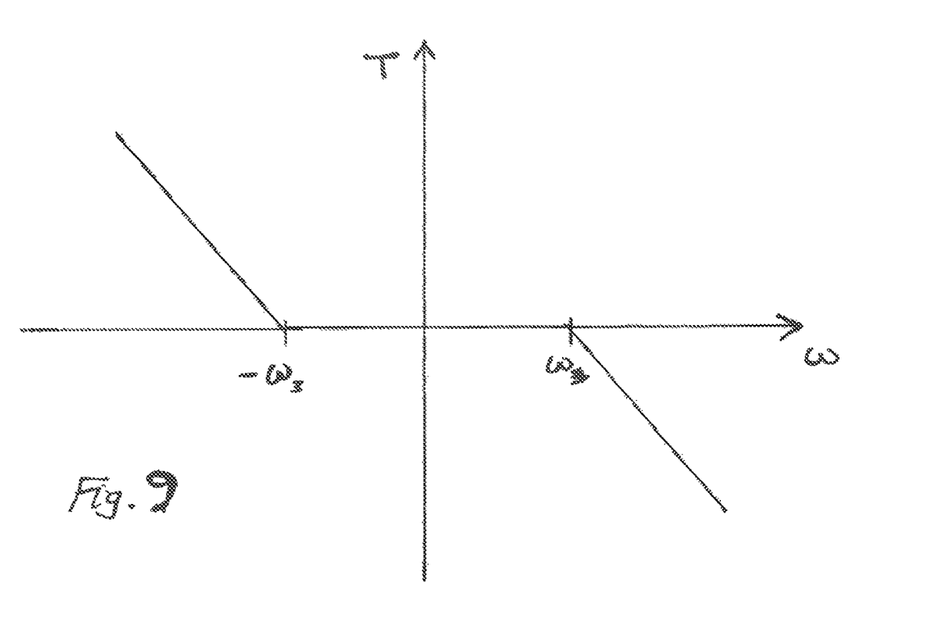
FIG. 9 is a graph illustrating the relationship of output torque to rotational speed in accordance with the embodiment of FIG. 8.

In this protocol, the dependence of output torque T of the motors 10 on the rotational speed $\omega$ of the motor 10 is illustrated in FIG. 9. It should be stressed that, during the braking mode, the pinion gears 9 are being driven not by the associated motor 10 but by the gear wheel 8 as a result of the yaw rotation of the nacelle 3. As can be seen from the drawing, when the magnitude, or absolute value, of the rotational speed is less than $\omega_3$, the motors 10 generates no counter-torque T. Only when the magnitude of the rotational speed $\omega$ is greater than $\omega_3$ is the counter-torque T applied, and the level of the counter-torque T increases monotonically with the rotational speed $\omega$.

It will be appreciated that many modifications to the embodiments described above may be made without departing from the scope of the present invention which is defined by the following claims.

For example, although there are three preferred embodiments each involving a respective control protocol, it is envisaged that these may be combined. Thus, the first protocol described above with reference to FIG. 3 may be applied to the second protocol illustrated in the flowchart of FIG. 6 such that, during a yaw rotation, the high-level torque of the second embodiment adopts a value in dependence on the rotational speed of the motors. In addition, the first protocol may be applied to the third protocol described above with reference to the flowchart of FIG. 8, such that, during counter-torque braking, the level of counter-torque generated by the motors equally adopts a value in dependence on the rotational speed of the motors.

In addition, although in the preferred embodiments described above the pinion gears 9 are arranged within the main gear wheel 8, it would of course be possible to arrange the pinion gears 9 either within or on the outer periphery of the main gear wheel 8. Furthermore, although in the preferred embodiments the motors are a.c. motors powered from the mains grid via frequency converters, if would be possible alternatively to use d.c. motors.

The invention claimed is:

1. A control system for a horizontal-axis wind turbine generator in which a nacelle is arranged for rotation about a vertical axis relative to a tower, the system comprising:
    a mechanical brake configured to selectively brake the relative rotation of the nacelle about the vertical axis;
    a motor configured to selectively rotate the nacelle about the vertical axis; and
    a control module configured to detect a first operating condition of the wind turbine generator and a second operating condition of the wind turbine generator;
    the control module, in response to receiving a brake command signal, being configured for monitoring the external load on the nacelle and for selectively controlling the braking mode for braking during the relative rotation of the nacelle;
wherein the control module, in response to detecting the first operating condition, is configured to engage the mechanical brake to brake the relative rotation of the nacelle about the vertical axis;
    wherein the control module, in response to detecting the second operating condition, is configured to control a supply of power to the motor to generate a counter-torque to brake the relative rotation of the nacelle about the vertical axis with the magnitude of the generated counter-torque increasing with the magnitude of the rotational speed of the motor in the second operating condition; and
    wherein the first operating condition comprises an external load which is less than a first predetermined value, the second operating condition comprises an external load which is greater than a second predetermined value, and the first predetermined value of the external load is less than the second predetermined value of the external load.

2. The control system as claimed in claim 1,
    wherein the control module is configured to maintain the output torque of the motor within a range of torque values defined by a minimum torque value and a maximum torque value while the rotational speed of the nacelle about the vertical axis remains within a range of speed values defined by a minimum speed value and a maximum speed value; and
    wherein a ratio of the maximum speed value to the minimum speed value is greater than a ratio of the maximum torque value to the minimum torque value.

3. The control system as claimed in claim 2, wherein the control module is configured to change the output torque of the motor to a new range of torque values to cause the rotational speed to return to a level within the range of speed values when the rotational speed moves outside the range of speed values.

4. The control system as claimed in claim 2, wherein the control module is configured to maintain the motor at a substantially constant output torque while the rotational speed remains within the range of speed values.

5. The control system as claimed in claim 1, wherein, in response to detecting the first operating condition, the control module is configured to control the supply of power to the motor to generate substantially no output torque.

6. The control system as claimed in claim 1, wherein, in response to detecting the second operating condition, the control module is configured to disengage the mechanical brake.

7. The system of claim 1, wherein the control module is configured to control a mode of braking, using either the mechanical brake or braking using the motor brake, as a function of external load such that:
    upon increasing load below the second operating condition, mechanical braking is applied until the second operating condition is detected, at which time braking is switched from the mechanical brake to braking by the motor brake; and
    upon decreasing load from the second operating condition, braking is provided by motor brake until the first operating condition is detected, at which time braking is switched from braking by the motor brake to braking by the mechanical brake.

8. The control system as claimed in claim 1, wherein the nacelle is arranged for rotation about the vertical axis relative to the tower by a plurality of electric motors each arranged to control rotation of a respective pinion gear, the pinion gears being arranged for engagement with a single gear wheel, and
    wherein the control module is configured to control a speed of each motor such that the speed is at a first level until each of the respective pinion gears has fully engaged the single gear wheel, and a second level thereafter to effect relative rotation of the nacelle about the vertical axis, the second level being higher than the first level.

9. The control system as claimed in claim 8, further comprising an encoder for determining the output torque of each motor.

10. The control system as claimed in claim 9, wherein the encoder is configured to determine an output rotational speed of each motor.

11. A method for controlling a horizontal-axis wind turbine generator in which the nacelle is arranged for rotation about a vertical axis relative to the tower by an electric motor, and in which a mechanical brake is provided, the method comprising:

with the receipt of a brake command signal, monitoring the external load on the nacelle and selectively controlling the braking mode for braking during the relative rotation of the nacelle based on the external load;

detecting a first operating condition of the wind turbine generator and a second operating condition of the wind turbine generator; and in response to detecting the first operating condition, causing the mechanical brake to brake the relative rotation of the nacelle about the vertical axis; and in response to detecting the second operating condition, controlling a supply of power to the motor to generate a counter-torque to brake the relative rotation of the nacelle about the vertical axis with the magnitude of the generated counter-torque increasing with the magnitude of the rotational speed of the motor in the second operating condition;

wherein the first operating condition comprises an external load which is less than a first predetermined value, wherein the second operating condition comprises an external load which is greater than a second predetermined value, and wherein the first predetermined value of the external load is less than the second predetermined value of the external load.

12. The method as claimed in claim 11, further comprising:

controlling the power supplied to the motor such that, while the rotational speed remains within a range of speed values defined by a minimum speed value and a maximum speed value, the output torque of the motor is also maintained within a range of torque values defined by a minimum torque value and a maximum torque value, wherein the ratio of the maximum speed value to the minimum speed value is greater than the ratio of the maximum torque value to the minimum torque value.

13. The method as claimed in claim 11, wherein the nacelle is arranged for rotation about the vertical axis relative to the tower by a plurality of electric motors each arranged to control rotation of a respective pinion gear, the pinions gears being arranged for engagement with a single gear wheel, the method further comprising:

controlling the power supplied to each motor such that the speed is at a first level until each of the respective pinion gears has fully engaged the single gear wheel, and a second level thereafter to effect relative rotation of the nacelle and the tower, the second level being higher than the first level.

14. The method of claim 11, further comprising:

when detecting an increasing load below the second operating condition, applying mechanical braking until the second operating condition is detected;

when the second operating condition is detected, switching from the mechanical brake to braking by the motor brake;

when detecting a decreasing load from the second operating condition, applying motor braking until the first operating condition is detected; and when the first operating condition is detected, switching from braking by the motor brake to braking by the mechanical brake.

* * * * *